Dec. 1, 1970  D. F. WILKES  3,543,595
SNAP ACTION APPARATUS
Filed March 29, 1968  4 Sheets-Sheet 1
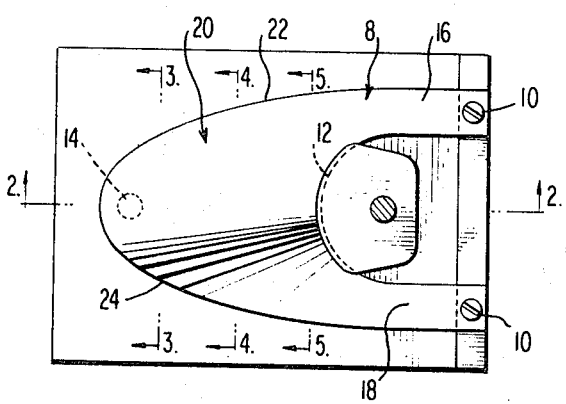
FIG.1
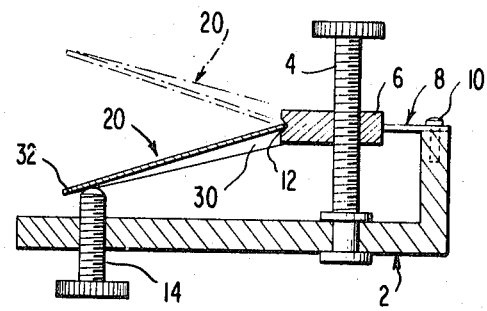
FIG.2
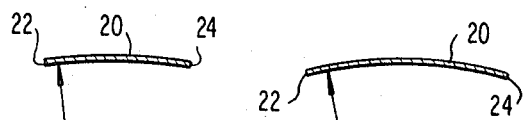
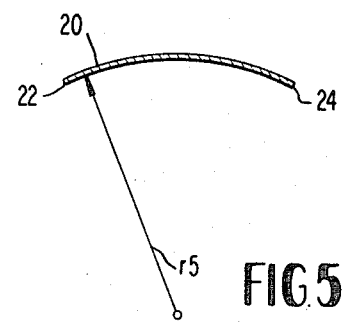
FIG.3  FIG.4  FIG.5
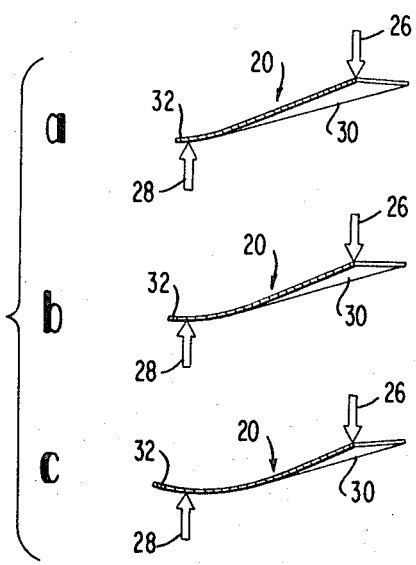
FIG.6
INVENTOR
DONALD F. WILKES
BY Bruns, Doane, Benedict, Swecker & Mathis
ATTORNEYS

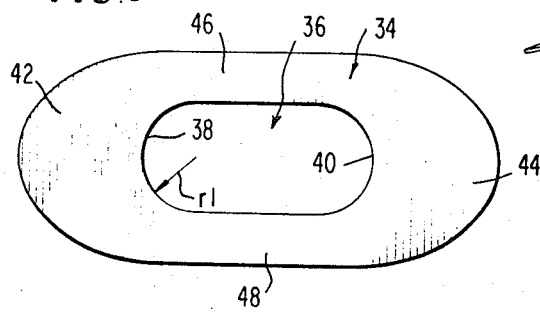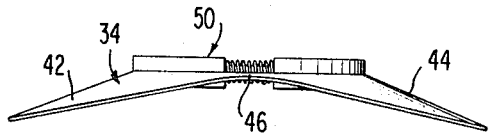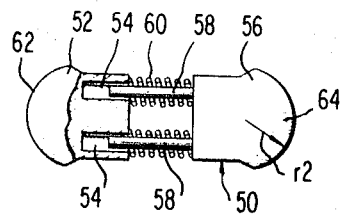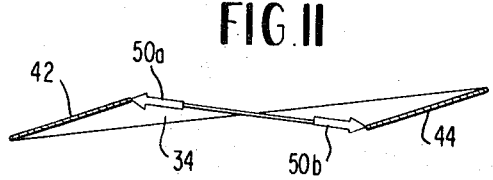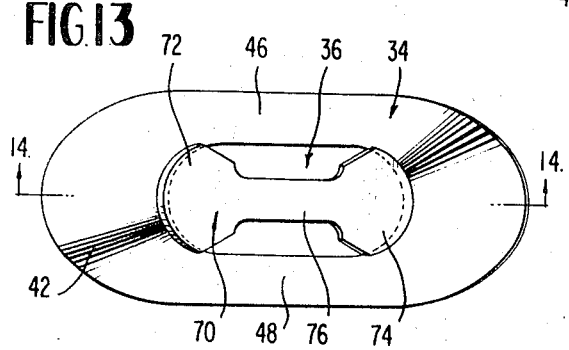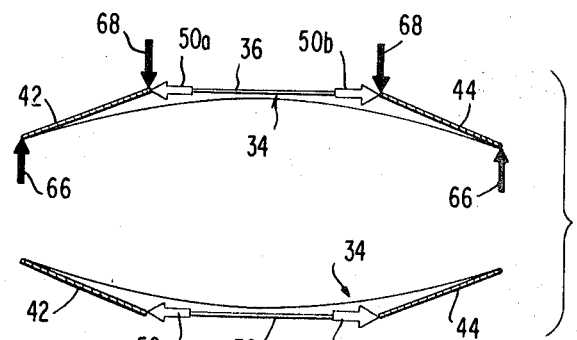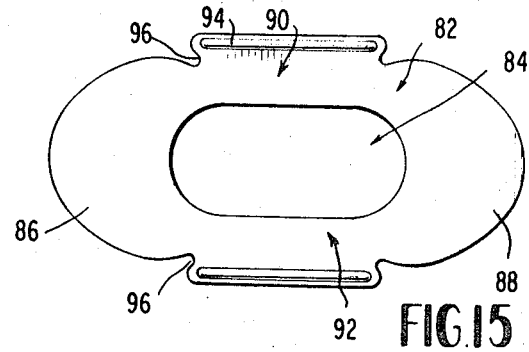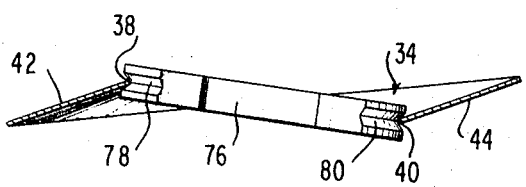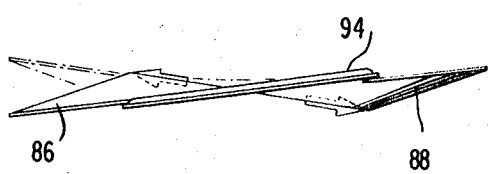

Dec. 1, 1970      D. F. WILKES      3,543,595

SNAP ACTION APPARATUS

Filed March 29, 1968      4 Sheets-Sheet 3

Dec. 1, 1970  D. F. WILKES  3,543,595
SNAP ACTION APPARATUS
Filed March 29, 1968  4 Sheets-Sheet 4
FIG. 24
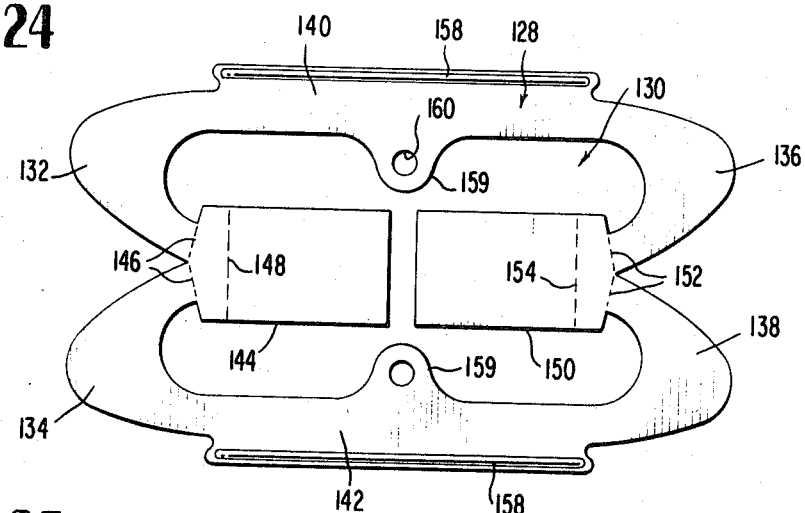
FIG. 25
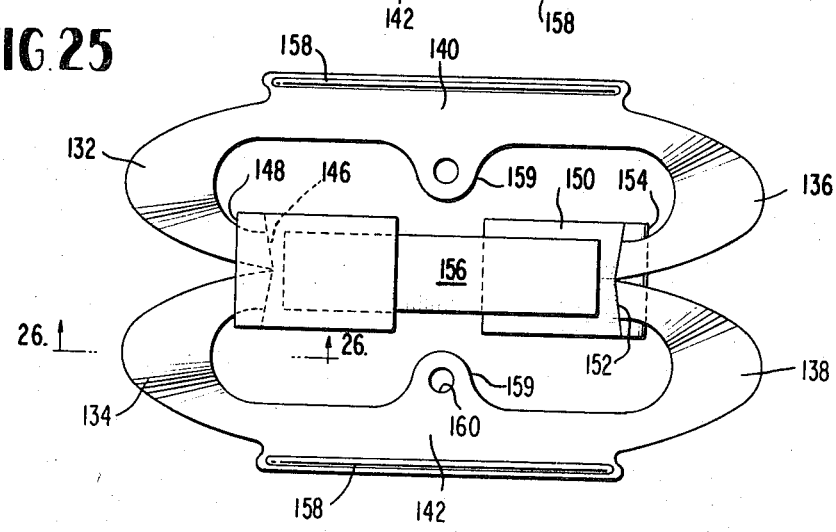
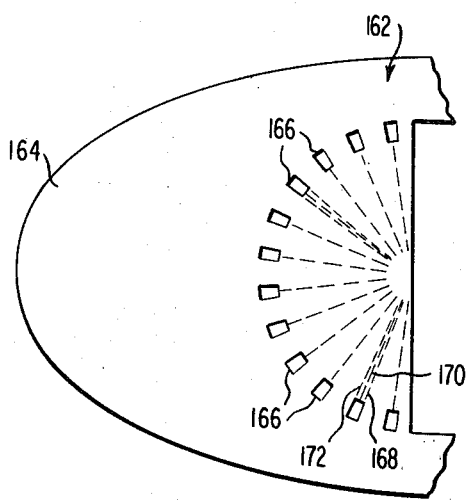
FIG. 27
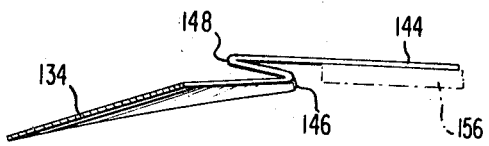
FIG. 26

United States Patent Office 3,543,595
Patented Dec. 1, 1970

3,543,595
SNAP ACTION APPARATUS
Donald F. Wilkes, Albuquerque, N. Mex., assignor to Rolamite Technology Incorporated, San Francisco, Calif., a corporation of California
Filed Mar. 29, 1968, Ser. No. 717,114
Int. Cl. F16h *49/00;* H01h *13/32*
U.S. Cl. 74—100                                   20 Claims

ABSTRACT OF THE DISCLOSURE

A snap action device formed by a thin resilient sheet elastically stressed into a three dimensional configuration. The shape of the sheet provides one or more bi-stable segments in which the cross buckling modulus of successive transverse cross sections decreases from one end of the segment to the other. Relative movement of the ends of a bi-stable segment causes transverse buckling of the segment to progress lengthwise to the end of the segment and then the segment snaps over into a reversely curved configuration.

CROSS REFERENCES TO RELATED APPLICATIONS

Two patent applications of Donald F. Wilkes disclosing electrical switching devices embodying the motion translating apparatus of this invention are being filed concurrently herewith, and the disclosures thereof are incorporated herein by reference. The applications are entitled respectively "Electrical Contact Making and Breaking Apparatus" (Ser. No. 717,090, filed Mar. 29, 1968) and "Magnetically Operable Switching Apparatus" (Ser. No. 717,113, filed Mar. 29, 1968) now Patent No. 3,479,624.

BACKGROUND OF INVENTION

This invention relates to snap-acting devices of the type in which a gradual motion of one portion or part of the device is translated into a sudden motion of another portion or part of the device. The invention is concerned particularly with a component in which a thin springy sheet is elastically stressed so as to provide a plurality of coned bi-stable segments.

Snap acting devices formed from thin springy material have been employed extensively heretofore in various of equipment. For example, in many electrical switching operations it is important that the contact making and breaking sequences be effected with great rapidity in order that contact surface degradation may be minimized, and snap action components have been found to be quite useful in such applications. However, the components available heretofore for such use have been subject to a number of disadvantages.

A member which is to move with a snap action should ideally have as little mass as is possible in order that its inertia characteristics may not interfere unduly with the attainment of the desired quick motions. On the other hand, it is of course essential that the rigidity of a snap acting element be great enough to enable it to transmit the mechanical forces required for the application in which the component is employed. For example, in an electrical switching application the need for quickness in contact making and breaking sequences is not a factor which can be dealt with apart from the need to maintain a substantial pressure between the contacts when they are in engagement. Similar, seemingly conflicting, design requirements arise in connection with the various other applications proposed for snap acting devices. However, little progress toward practical resolutions of these problems has been made heretofore.

Additionally, many of the snap action configurations proposed heretofore have been characterized by ambiguous flexure patterns. Although some sort of buckling of spring material has often been relied upon to produce the desired snap action, precise control over the patterns of the buckling actions which take place in particular devices has been difficult to achieve.

Moreover, many of the constructions proposed heretofore gave rise to serious fabrication problems. This was true particularly in connection wah those proposals in which permanently deformed spring metal elements were relied upon to produce the desired snap action. In fabricating such devices, it was necessary to permanently deform a strip of sheet metal so that its natural shape was something other than flat and so that the material would have a predetermined resistance against being returned to a flat condition during use. However, the nature of very thin sheet material is such that closely controlled permanent deformations cannot be produced reliably in mass production operations.

Even in those few instances where the prior art structures have embodied arrangements for elastically stressing sheet metal materials so as to provide the desired three dimensional configurations needed for snap action devices, control over the critical stressing forces has been difficult because some spring element external to the sheet material itself ordinarily has been relied upon to supply the stressing forces. In such instances, product uniformity is almost impossible to obtain on a mass production scale.

SUMMARY

It is accordingly an object of this invention to provide snap action apparatus which can be manufactured reliably and in which the snap acting elements or portions are light in weight, are capable of transmitting substantial forces, and are susceptible of being flexed in definite patterns.

Another object of the invention is to provide snap action apparatus in which the desired snapping motions are accomplished in thin springy sheet material elastically distorted from its natural flat condition and in which the character of the elastic deformations imparted to the sheet is controlled by two dimensional shape features rather than by reliance upon three dimensional permanent deformations.

A more specific object of the invention is to provide a component having a plurality of elastically coned bi-stable segments of thin springy material.

In accordance with the invention, the desired snap action is derived from a thin resilient segment of sheet material the longitudinally spaced apart end portions of which are to be moved relative to each other. The segment is elastically deformed so that it assumes a first three dimensional configuration in which its front face is convex in a transverse direction or a second three dimensional configuration in which its front face is concave in a transverse direction. The shape of the segment in either of these three dimensional configurations is such that each successive transverse cross section thereof, proceeding longitudinally from one end, is more resistant to cross buckling than the preceding transverse cross section. Hence, as the end portions of the segment are moved relative to each other, a buckling wave progresses longitudinally along the segment toward the stiffest transverse cross section which, as indicated, is located at one end of the segment. Then, when the buckling wave reaches the end of the segment, the segment snaps over to its reversely curved three dimensional configuration.

In one embodiment, a generally elliptical element of thin, naturally flat, resilient sheet material is provided with a central opening having curved end edge portions and a rigid center element of a length greater than the length of the opening in the flat sheet material is positioned within the opening so as to bear against the curved end edge portions of the opening and cause the sheet material to assume a nonplanar configuration. The ends of the rigid center element are curved convexly at radii of curvature less than the natural radii of curvature of the curved end edge portions of the opening. When the parts are assembled however, the curved edge portions of the opening are deformed elastically to shorten their radii of curvature so as to make them comform to the shapes of the ends of the center element. As the radii of curvature of the curved end edges of the opening are shortened, the adjacent outwardly protruding segments of the resilient sheet are elastically warped into coned configurations extending at angles to the original plane of the material.

The segments of the sheet of thin springy material protruding outwardly from the ends of the center element are positionally unstable when forced into the plane of the central opening in the sheet. Each segment becomes highly stable, however, when it is allowed to assume a coned configuration extending to one or the other side of the plane of the opening in the sheet with a convex surface of the segment facing toward the plane of the opening. Hence, each such segment becomes a bi-stable element which can be snapped back and forth between its two stable positions.

The coned shapes of the bi-stable segments greatly enhance their capacities to transmit forces. In this connection, it should perhaps be pointed out that the sheet material itself preferably is quite thin, so as to minimize the masses of the bi-stable segments and thereby minimize their inertia characteristics. A planar body of such material would be very flexible and would have little capacity to transmit forces when loaded as a beam. A flat strip would bend so readily in response to a force applied perpendicularly to its surface that it would be relatively ineffective as a means for transmitting that force to a remote location. This difficulty is overcome in the present invention, because the coning of the segments of the thin springy sheet material greatly increases the rigidity of the material.

It will be understood, however, that the rigidity of such a bi-stable element is not uniform along the length of the element. At any given transverse cross section, the resistance to buckling is a function of the width, the thickness, and the radius of curvature of that particular portion of the segment. In this embodiment the thickness factor remains constant, but both the width and the radius of curvature factors change from one transverse cross section to the next. Because of the coned configuration of the segment, the radius of curvature is smallest at the inner boundary of the segment next to the rigid center piece, so that the stiffening effect of the curvature is greatest at this point. Because of the elliptical outline of the sheet, the width factor also is maximized at the inner end of each bi-stable segment. Thus, each transverse cross section of the segment has a lower cross buckling modulus than the adjacent transverse cross section on the inner side thereof.

Another significant feature of the assembly is that it is a self-balancing configuration. The zones of bearing contact between the edges of the opening in the sheet of resilient material and the rigid center element are arranged so that the algebraic sum of the bearing forces is zero. That is, the bearing forces exerted on the center element by one bi-stable element are opposed and counterbalanced by other bearing forces exerted upon the center piece by the sheet material. The symmetrical shape characteristics of the assembly also make it possible to attain good balance in the assembly as a whole, a feature which is of some importance in instances where the assembly is apt to be accelerated rapidly.

BRIEF DESCRIPTION OF THE DRAWINGS

A more complete understanding of these and other features and advantages of the invention will be gained from a consideration of the following description of certain embodiments illustrated in the accompanying drawings, in which:

FIG. 1 is a plan view of a very simple form of snap action apparatus embodying certain principles of the invention;

FIG. 2 is a longitudinal cross sectional view taken along the line 2—2 in FIG. 1;

FIGS. 3, 4 and 5 are transverse cross sectional views of the thin resilient element of the apparatus of FIG. 1, the views being taken respectively along the lines 3—3, 4—4 and 5—5 in FIG. 1;

FIG. 6 is a sequence of diagrams illustrating the action of the thin resilient element of FIG. 1 when the ends thereof are moved in opposite directions;

FIG. 7 is a plan view of a thin flat sheet element of springy material suitable for use in another embodiment of the invention;

FIG. 8 is a plan view, with one portion broken away to reveal interior features, of a center piece element suitable for use with the flat element of FIG. 7;

FIG. 9 is a side elevational view showing the elements of FIGS. 7 and 8 in their assembled relation and showing both of the elastically coned segments of the resilient element as extending downwardly relative to the center piece;

FIG. 10 is a similar side elevational view showing one of the elastically coned end segments of the resilient element in a reverse position;

FIG. 11 is a diagram in which the center piece has been replaced by a pair of oppositely directed force arrows and in which the thin resilient element, in the condition thereof depicted in FIG. 10, is illustrated in longitudinal cross secton;

FIG. 12 includes two similar diagrams $a$ and $b$ illustrating different stable conditions of the resilient element of FIGS. 9 and 10, and FIG. 12$a$ also includes force arrows indicating the locations and directions of the forces required to snap the coned end segments of the resilient element from the positions shown in diagram $a$ to the positions shown in diagram $b$;

FIG. 13 is a plan view of another embodiment of the invention in which the center piece is in the form of a unitary member;

FIG. 14 is a longitudinal cross sectional view taken along the line 14—14 in FIG. 13;

FIG. 15 is a plan view similar to FIG. 7, but illustrating another suitable configuration for the thin resilient element;

FIG. 16 is a diagrammatic elevational view showing in full lines an edge view of the element of FIG. 15 as it appears when a suitable center piece is associated therewith in accordance with the invention and showing in broken lines some positions that would have to be assumed by certain portions of the element if an attempt were made to cause both of the end segments to cone upwardly from the center piece;

FIG. 24 is a plan view of yet another form of thin resilient element which may be employed in practicing the invention, the element being shown in a flat condition;

FIG. 25 is a plan view showing the element of FIG. 24 in its elastically deformed three dimensional configuration and showing a center member attached thereto;

FIG. 26 is a partial longitudinal cross sectional view taken along the line 26—26 in FIG. 25; and FIG. 27 is a partial plan view showing in its initial flat condition an end portion of still another form of thin resilient element in accordance with the invention.

DESCRIPTION OF PREFERRED EMBODIMENTS

Figure 17:
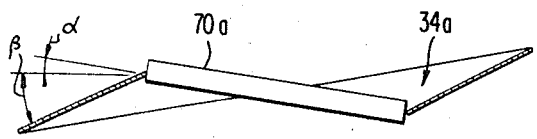
FIGS. 17 and 18 are comparative diagrams depicting the different angular relationships which exist in two embodiments of the invention which differ from each other only with respect to the lengths of the respective center pieces and the corresponding center openings in the thin resilient elements.

As illustrated in FIGS. 1 and 2, the snap action apparatus includes a support 2 rotatably supporting a screw threaded member 4 which passes through a threaded opening in a body element 6. The member 4 supports the element 6, and when the member 4 is rotated, the element 6 will move vertically.

A naturally flat element 8 of thin resilient material such as a spring metal sheet is attached by screws 10 to the support 2 and bears against the base of a notch 12 in a front edge portion of the body element 6. Another screw threaded member 14 is mounted in a threaded hole in the support 2 at a location near the free end of the element 8. When the member 14 is rotated in one direction, its upper end will press upwardly against the outer free end portion of the resilient element 8.

The shape of the resilient element 8 is important. In the flat, unstressed, condition of this element, the radius of curvature of the edge portion which is to cooperate with the notch 12 is somewhat greater than the radius of curvature of the base of the notch, and the rearwardly extending leg portions 16 and 18 diverge rearwardly. However, in the assembly operation, the resilient element is elastically deformed by bringing the rear ends of the legs 16 and 18 together sufficiently to reduce the radius of curvature of the bearing edge portion of the element and make that portion conform to the curvature of the base of the notch 12 in the body member 6. The screws 10 then serve to hold the inner end portions of the element 8 in their deformed conditions. The outer portion 20 of the element 8 is not so held, however, and, in seeking a minimum energy state, it tries to assume a three dimensional, coned, configuration extending longitudinally away from the plane of the notch 12 at an angle either above (broken line position in FIG. 2) or below (full line position in FIG. 2) the plane of the notch.

The coned configuration of the segment 20 contributes materially to its capacity to transmit forces when the segment is loaded as a beam. Referring to FIG. 2, let it be assumed that a downwardly directed force is applied to the inner end of the coned segment 20 by the notch 12 and that an upwardly directed force is applied to the outer portion of the segment by the screw 14. The resistance of the segment to bending under the influence of this beam-type loading is not at all comparable to the meager resistance to bending that would be offered by a flat strip of the same material having the same thickness (the cross hatched area of the segment 20 in FIG. 2). Instead, the coned configuration of the end segment 20 makes it somewhat comparable to an arch the overall rigidity of which is very much greater than that of any isolated portion.

Another significant characteristic of the shape of the outer segment 20 of the element 8 is the taper provided by the outwardly converging lateral margins 22 and 24 thereof. This tape is visible in FIG. 1 and is even more apparent from a comparison of FIGS. 3, 4 and 5. These latter views also provide a graphic illustration of the ever decreasing radii of curvature of successive transverse cross sections of the coned portion 20 as one moves inwardly from the outer end. The radius of curvature $r3$ at an outer cross section is greater than the radius of curvature $r4$ at a cross section near the middle, and $r4$ is greater than the radius of curvature $r5$ of a cross section near the inner end.

The diagrams of FIG. 6 illustrate the manner in which the thin resilient coned member 20 of the device flexes when relative movement between its ends occurs. The downwardly directed arrows 26 in these diagrams indicate downwardly directed forces applied to the inner end of member 20 by the body element 6, and the upwardly directed arrows 28 indicate upwardly directed forces applied to the outer end of the portion 20 by the screw member 14. As will be evident, such forces may be generated by rotating member 14 and/or member 4.

Diagram $a$ of FIG. 6 shows the shape assumed by the thin resilient member 20 after some deflection has occurred in response to relative movement of the inner and outer ends. The nature of this deflection is significant. Although the angularly directed, coned, configuration of the inner or right end portion 30 of the segment 20 has been preserved, the outer or left tip portion 32 of the segment has been unable to retain its initial shape under the loads imposed on the segment and it has buckled into a transversely flattened condition. In its flattened condition, the left end portion 32 has less rigidity and, as indicated in the diagram, it bends somewhat in a longitudinal direction.

Further relative movement between the ends of the segment 20 will cause the element to assume a configuration such as that shown in diagram $b$ of FIG. 6. In this diagram, it will be observed that the transversely buckled outer end portion 32 has increased in length at the expense of the shape-retaining inner end portion 30. A similar result flows from further relative movement of the segment ends, as indicated in diagram $c$. In fact, the transverse buckling progresses as a wave toward the inner end of the segment.

In describing the characteristic of the coned segment 20 which permits the flexing of the segment to proceed as a controlled wave, it will be helpful to refer to the "cross buckling modulus" of individual transverse cross sections. As used herein, the "cross buckling modulus" of a transverse cross section means the resistance of that cross section, in its curved shape, to elastic buckling thereof from its curved shape to a straight shape. This resistance is a function of both the width and the curvature of the cross section in that either a reduction of the width or an increase in the radius of curvature of a cross section would tend to lower its cross buckling modulus.

The segment 20 is characterized by cross buckling moduli that progressively decrease outwardly from the end which contacts the body member 6. That is, the cross buckling modulus of successive transverse cross sections decreases monotonically outwardly from the root or inner end of the coned segment. Although the rate of modulus change need not be uniform throughout the length of the segment 20, it should be high enough at all points to assure that the unidirectional pattern of change will be preserved in spite of minor shape changes in zones immediately ahead of the buckling wave front.

It also is of interest to note that the force-deflection curve for the segment 20 is non-linear. This non-linearity in the spring characteristics of the segment is significant in that the segment will not resonate. Hence, the apparatus will be suitable for use in environments where vibration might otherwise present serious problems.

Referring again to FIG. 6, continued relative movement between the ends of the segment 20 from the positions shown in diagram $c$ will cause the buckling wave to progress to the inner end or root of the segment 20. At that instant, the segment will have no capacity to retain its downwardly directed orientation and it will flip or snap over rapidly to the upwardly coned configuration shown in broken lines in FIG. 2.

The segment 20 may be returned manually to the full line position of FIG. 2 after the appropriate changes in the relative positions of the screw member 14 and the body member 6 have been made so as to return these parts to their illustrated positions.

Of course, the embodiment of FIGS. 1 to 6 is but one example of the many snap action devices that may be constructed so as to produce the controlled flexure patterns discussed in detail above. Other embodiments which incorporate additional advantageous features are shown in the remaining views of the drawings.

In FIG. 7, the thin resilient element 34 is a naturally flat sheet provided with an elongated central opening 36 the end edge portions or zones 38 and 40 of which are concavely curved. In order to facilitate explanation of principles of the invention, the curves illustrated in FIG. 7 are arcs of circles having equal radii, and one such radius has been designated $r^1$ in this view. The sheet 34 includes end portions or segments 42 and 44 extending longitudinally outward from the curved edge portions 38 and 40 of the central opening 36, and longitudinally extending side strips 46 and 48 connecting the end segments 42 and 44 together.

FIG. 8 illustrates a center piece 50 adapted to be fitted within the central opening 36 in the thin resilient element 34 shown in FIG. 7. This particular center piece 50 is relatively complex. Nevertheless, an explanation of this embodiment will serve to clarify certain force relationships between the center piece and the thin resilient element which are present also in simpler embodiments of the invention to be described hereinafter.

The center piece 50 includes an end member 52 having a plurality of openings 54 in its inner face, and an end member 56 having a plurality of guide rods 58 protruding from its inner face into the openings 54. Compression springs 60 surround the rods 58 and tend to force the end members 52 and 56 away from each other. The outer edges 62 and 64 of the end members 52 and 56 are curved convexly. As shown, these curves are arcs of circles having equal radii $r^2$, and this radius is shorter than the radius of curvature $r^1$ of the corresponding curved zones 38 and 40 of the edge of the central opening 36 in the thin resilient element 34.

The extended length of the center element 50 as illustrated in FIG. 8 is somewhat greater than the length of the opening 36 in the element 34. However, the center element 50 may be collapsed against the action of the springs 60 so that it may be inserted into the opening 36. When the collapsing forces on the center element 50 are released, the springs 60 then will press the convex end portions 62 and 64 of the center element 50 into bearing contact with the concave edge portions 38 and 40 of the opening 36.

These bearing forces should be sufficiently great to deform the resilient sheet 34 and cause the concave edge portions 38 and 40 of the opening 36 to conform to the curvature of the ends 62 and 64 of the center element 50. The shortening of the radii of curvature of the end edge portions 38 and 40 of the central opening 36 is accompanied by a coning of the adjacent end segments 42 and 44 of the resilient element 34 out of the plane of the opening 36. Both end segments 42 and 44 may cone downwardly away from the center element 50 as indicated in FIG. 9, or they may cone away from the center element 50 in opposite directions as indicated in FIGS. 10 and 11.

However, each of the said segments 42 and 44 of the elastically stressed sheet 34 is highly unstable when forced to assume a flat condition in the plane of the central opening 36. That is, the bearing forces between the edges of the opening 36 and the center element 50 set up stress patterns within the material of the sheet 34 that can be relieved or minimized only when the end segments 42 and 44 are allowed to assume coned configurations, and each end segment aggressively seeks a coned configuration extending either above or below the plane of the opening. In either of these latter positions, the stress patterns will become balanced and the end segment will be positionally stable.

This bi-stability of the end segments 42 and 44 gives the assembly of the initially flat sheet 34 with the center piece 50 its capacity to function as a snap action component. In this connection it will be helpful to refer briefly to the diagrams designated $a$ and $b$ in FIG. 12. In these diagrams the center element 50 has been omitted for clarity of illustration, but the bearing forces of the end portions of the center element against the curved end edge zones of the center opening in the sheet 34 have been indicated by the unshaded arrows 50a and 50b.

In diagram $a$ of FIG. 12, there is illustrated a stable position of the component in which both of the end segments 42 and 44 cone downwardly from the plane of the central opening 36 in the sheet 34. However, the component may be forced out of this stable position by vertically moving inner and outer portions of the coned segments 42 and 44 relative to each other. For example, in FIG. 12a upwardly extending shaded arrows 66 have been applied to the outer free end portions of the coned segments 42 and 44 to indicate that these outer free end portions are restrained against downward movements, and downwardly extending shaded arrows 68 have been applied to inner portions of the coned segments 42 and 44 to indicate that these segments are being moved downwardly. The initial motion of the inner portions of the coned segments in a downwardly direction tends to flatten outer end portions of these segments in the manner described above in connection with the segment 20 of FIGS. 1 to 6. As the motion continues, the internal stresses in each of the segments 42 and 44 continue to build up and a cross buckling wave moves to the root of each segment. When the unstable center position is reached, each of the segments 42 and 44 snaps upwardly relatively to the plane of the central opening 36 in the sheet 34, and the component again assumes a minimum energy state with the end segments 42 and 44 of the sheet 34 coning upwardly as indicated in diagram $b$ of FIG. 12.

Although the diagrams of FIG. 12 illustrate a situation in which both of the end segments 42 and 44 of the sheet 34 are loaded so as to cause them to snap across their unstable central positions, it will be apparent that the particular loading pattern shown in FIG. 12a is exemplary only. If desired, for example, the component may be loaded so as to snap only the end segment 44. In this instance, the shape of the component would change from that illustrated in diagram $a$ of FIG. 12 to that illustrated in FIG. 11.

FIGS. 13 and 14 illustrate another embodiment of the invention in which the thin resilient element 34 of FIG. 7 is associated with a unitary center element 70. The element 70 is a rigid member having enlarged end portions 72 and 74 connected together by a narrowed central portion 76. The ends of the end portions 72 and 74 are curved at radii of curvature less than the radius of curvature $r^1$ of the concave end zones 38 and 40 of the opening 36 in the sheet 34, and these ends are provided with grooves or notches 78 and 80 for receiving the curved edge portions 38 and 40.

The length of the center element 70, as measured between the bases of the notches 78 and 80, is sufficiently greater than the length of the central opening 36 in the flat sheet 34 that the sheet 34 must be deformed in order to position the center element 70 within the opening 36. Hence, substantial bearing forces are developed between the curved end edge portions 38 and 40 of the opening 36 in the sheet 34 and the opposite ends of the center element 70, causing the radii curvature of the edges 38 and 40 to shorten and conform to the radii of curvature of the convex ends of the center piece. This deformation cones the end segments 42 and 44 away from the plane of the central opening 36 in the sheet 34 and gives each of them a bi-stable characteristic.

The embodiment of FIGS. 13 and 14 has a number of important practical advantages. In this connection it should be noted that the stressing of the flat sheet 34 is controlled by the shapes imparted to the curved end portions 38 and 40 of the central opening 36 in the sheet 34 and by the shapes imparted to the end portions 72 and 74 of the center element 70. These shapes are easily reproducible in mass production operations and uniformity of stressing is virtually assured. Moreover, the stressing of the sheet takes place through edge loading and the response of very thin sheet materials to this type of loading is highly uniform, so that by controlling the stressing of the sheet one also obtains close control over the coned configurations assumed by the end segments 42 and 44 as they seek their minimum energy states.

The lengthwise rigidity of the center piece also contributes to the aggressiveness with which the coned end segments 42 and 44 resist deformation. A force pattern which would tend to straighten a coned end segment would necessarily, in view of the unyielding character of the center piece 70, serve to build up the stresses within the sheet 34, and, in view of the resilient character of the sheet material, these stresses would produce reaction forces tending to resist further deformation. Hence, the snap action characteristics of this component are quite definitive and reliable.

FIGS. 15 and 16 illustrate another form of thin resilient sheet element which may be used with a center piece such as that designated 70 in FIG. 13 or that designated 50 in FIG. 8. In this embodiment, the thin resilient element 82 is provided with an elongated central opening 84 and end segments 86 and 88 corresponding in all relevant respects to the central opening 36 and the end segments 42 and 44 of the resilient element 34 shown in FIG. 7. However, the side strips 90 and 92 of the element 82 have been given configurational features which can contribute materially to the performance of the component in some environments.

Each of the side strips 90 and 92 is provided with a longitudinal stiffening rib 94 which makes it more resistant to bending. The use of such stiffening ribs is indicated particularly in instances where it is desirable that the opposed end segments 86 and 88 operate out of phase with each other in the sense that, when the segment 86 is coned downwardly from the plane of the central opening 84, the opposite end segment 88 will cone upwardly away from that plane.

This arrangement is illustrated in FIG. 16, and the presence of the stiffening rib 94 tends to preserve this orientation of the directions of the two end segments relative to each other. An attempt to change this orientation so as to bring the end segment 86 into its upwardly coned stable position without simultaneously changing the position of the other end segment 88 relative to the plane of the central opening 84 would fail, unless, as indicated by the broken lines in FIG. 16 the forces exerted were sufficiently great to bend the stiffening ribs 94. Since the application of such large forces to the component would be highly abnormal, the stiffening ribs 94 can be relied upon in practice to lock the two coned end segments 86 and 88 in their out of phase relationship to each other.

The stiffening ribs 94 may be formed in the resilient element 82 by conventional stamping techniques. Although these ribs are permanent deformations in the material of the resilient element 82 and some irregularities can be expected to result from their formation, the cross sections of the ribs are in no wise critical and such irregularities will not adversely affect the overall performance of the component.

FIG. 15 also illustrates a cutout 96 at each marginal edge of the coned end segments 86 and 88. These cutouts serve to reduce the width of the material in the adjacent portions of element 82 and thereby reduce the capacities of such portions to transmit deflection-producing stresses. In a sense, these cutouts 96 serve then to uncouple the coned end segments 86 and 88 from the adjacent side strips 90 and 92. It will be appreciated however that this uncoupling effect is not absolute in character, and some mechanical coupling will be retained.

Figure 18:
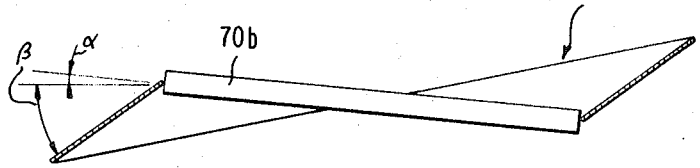

Yet another aspect of the invention is illustrated diagrammatically in FIGS. 17 and 18. In these views the thin resilient elements 34a and 34b are the same as the resilient element 34 in FIG. 7 except for the fact that the lengths of the side strips 46 and 48 differ. Similarly, the center elements represented diagrammatically at 70a and 70b are the same as the center element 70 shown in FIG. 13 except for the fact that they differ in length. In both of these views, the angle $\alpha$ is the angle of tilt of the center element with respect to the horizontal, and the angle $\beta$ is the angle of a coned end portion of the resilient element with respect to the horizontal.

The sum of the angles $\alpha$ and $\beta$ is the angle at which a coned end segment of the thin resilient element extends away from the plane of the central opening in the resilient element. This cone angle is of course fixed by the relative curvatures of the ends of the center element and the end edge portions of the central opening in the thin resilient element. This total angle or "cone angle" is therefore the same in FIGS. 17 and 18.

However, it will be observed that the angles $\alpha$ and $\beta$ illustrated in FIG. 17 differ from the angles $\alpha$ and $\beta$ in FIG. 18. The angle $\alpha$ in FIG. 17 is greater than the angle $\alpha$ in FIG. 18 and the angle $\beta$ in FIG. 17 is less than the angle $\beta$ in FIG. 18. This difference stems from the different lengths of the center pieces 70a and 70b.

The effect just described is of particular importance in connection with components which operate in such a fashion that the coned end segments of the resilient element are out of phase with each other. In such operations, the loading forces for snapping the end segments between their stable positions can best be applied by tilting the center element about a transverse axis and providing stationary reaction surfaces in position to cooperate with the outer free end portions of the resilient end segments to resist movements of these portions beyond their stable positions. As will be apparent from a comparison of FIGS. 17 and 18, the angle through which the center piece would have to be tilted in such a device in order to produce such a snapping action of the end segments can be chosen at will, and the desired result can be achieved through simple and highly controllable changes in the lengths of the center pieces and the central openings in the resilient elements.

It should be noted also that in highly elongated components of the type suggested in FIG. 18, significant angle amplifying effects can be produced by the components of this invention. That is, a small angular input motion of the center piece will bring about a relatively large angular output motion of the end segments of the resilient element. Such angle amplifier effects may be employed to advantage in various applications.

Figure 19:
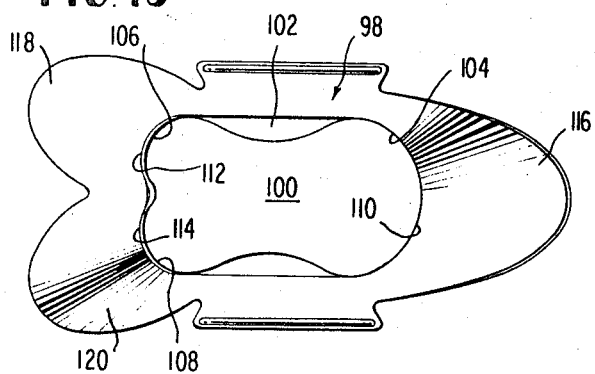
FIG. 19 is a plan view of another embodiment of the invention in which three bi-stable segments are provided.

FIG. 19 illustrates another embodiment of the invention in which three coned bi-stable segments have been provided. In this embodiment, a thin resilient element has been designated by the numeral 98 and an appropriate center element has been designated by the numeral 100. The thin resilient element 98 is provided with a central opening 102 having one curved edge portion 104 at one end thereof and two spaced-apart curved edge portions 106 and 108 at the opposite end thereof.

The center element 100 includes a curved end 110 having a radius of curvature somewhat less than the radius of curvature of the edge zone 104 of the center opening 102. At its opposite end the element is provided with two curved portions 112 and 114 each having a radius of curvature less than the natural radius of curvature of the adjacent curved edge portion of the central opening 102 in the resilient element 98. The center element 100 is relieved or cut away in the zones between the curved portions 110, 112 and 114 so that it contacts the edges of the central opening 102 in the resilient member only at the curved portions thereof indicated by the numerals 104, 106 and 108.

As in previously described embodiments of the invention, the dimensions of the center element 100 are sufficiently larger than the dimensions of the central opening 102 in the resilient element 98 as to require deformation of the resilient element when the parts are in their assembled relations to each other. That is, the radius of curvature of each of the curved edge portions 104, 106 and 108 of the central opening 102 in the resilient element 98 is shortened to make it conform in curvature to the adjacent convexly curved edge portion of the center element 98. Such deformation, in turn, causes the adjacent end segments 116, 118 and 120 of the resilient element 98 to cone outwardly from the center piece 100 and away from the plane of the central opening 102.

The internal stress patterns within the resilient element 98 of the component illustrated in FIG. 19 are somewhat more complex than the stress patterns in the resilient elements of the components described above, but persons skilled in the art will have no difficulty in envisioning the relevant relationships.

Figure 20:
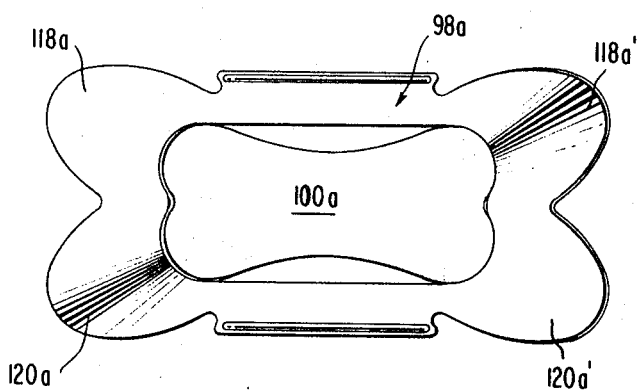
FIG. 20 is a similar plan view of still another embodiment of the invention in which four bi-stable segments are provided.

FIG. 20 is a view similar to FIG. 19, but illustrating another embodiment of the invention in which four coned bi-stable elements are provided. In this embodiment both ends of the component conform in shape to the left end of the component illustrated in FIG. 19. In FIG. 20 the center element has been desginated 100a and the thin resilient element has been designated 98a. The four coned bi-stable segments are designated respectively 118a, 118a′, 120a and 120a′. These reference characters correspond to reference characters employed in connection with the description of the embodiment illustrated in FIG. 19 and reference may be made to that description for an explanation of the constructional features.

A feature common to all of the embodiments described in connection with FIGS. 7 to 20 is that the concavely curved bearing edge portions of the central opening of the resilient element are spaced about the periphery of the central opening so that the algebraic sum of the bearing forces applied to the center member by these edge portions will always be zero. That is, no external mount or support for the center piece is required in order for the center piece to react properly with the edge portions of the central opening in the resilient element.

Figure 21:
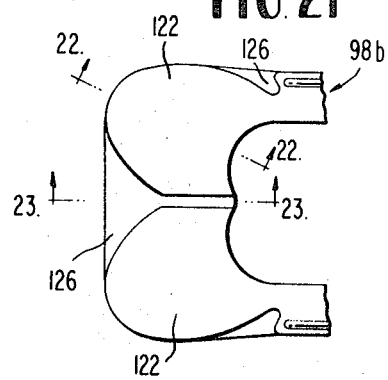
FIG. 21 is a partial plan view showing in its flat condition the end portion of another form of thin resilient element which may, in accordance with the invention, be stressed by a center piece to provide two coned segments generally comparable to the coned segments at each end of the embodiment illustrated in FIG. 20.
Figure 23:
FIG. 23 is a vertical cross sectional view taken along the line 23—23 in FIG. 21.

Yet another feature of the invention is illustrated in FIGS. 21 and 23. FIG. 21 shows a left end portion of a resilient element 98b suitable for use as a replacement for the resilient element 98 illustrated in FIG. 19. This element 98b is a laminate made up of a layer 122 of thin spring metal sheet material, a layer 124 of sheet adhesive, and a layer 126 of flexible plastic material such as a polyester sheet. Although the resilient elements of all the embodiments of the invention may, if desired, be formed from such laminates, the particular embodiment depicted in FIG. 21 is one in which discontinuities in the spring metal layer of the laminate are relied upon to provide mechanical uncoupling effects similar to those described above in connection with the cutouts 96 illustrated in FIG. 15.

In zones where some mechanical uncoupling is undesirable, the spring metal layer 122 may be interrupted either partially or entirely, and the flexible plastic layer 126 may be relied upon to provide the necessary structural continuity. In FIG. 21 for example, the segments which are to be coned into bistable configurations have a full complement of layers of the laminate, but in the zone between the two closely spaced segments illustrated in this view the spring metal layer 122 is interrupted entirely, and in the zones where the side strips join the end segments, the spring metal layer 122 is partially interrupted.

Figure 22:
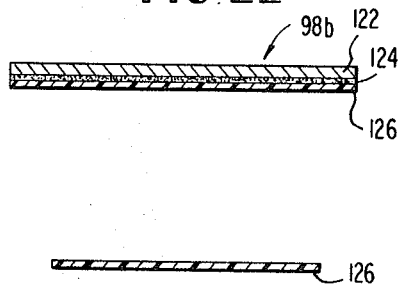
FIG. 22 is a vertical cross sectional view taken along the line 22—22 in FIG. 21.

It will be understood, of course, that the overall thickness of the resilient sheet element 98b is greatly exaggerated in FIG. 22. In most applications of the invention, the resilient element will be quite thin, and sheet material having thicknesses of a few hundredths of an inch or less will be found suitable. It is in general preferred that the material be as thin as is practical in view of the particular loading requirements to be met by the apparatus. Sheet metal materials having highly uniform structural properties may be produced in thicknesses gauged in thousandths of an inch, and such materials should be used wherever this is possible.

It also will be evident that, in this description, the characterizations of the various snap action segments as being "coned" should be considered as descriptive rather than as mathematical definitions. It is not essential in any of the embodiments of the invention described herein that the snap action segment or segments conform precisely in configuration to the surfaces of mathematically perfect cones.

FIGS. 24 through 26 further illustrate this point. These views relate to an embodiment of the invention in which a thin resilient element is elastically deformed to provide the desired snap action segments by folding operations rather than by compelling an edge portion of the element to conform to the curvature of a rigid body.

The thin resilient element 128 shown in its flattened natural condition in FIG. 24 is provided with a central opening 130, tapered lobes 132 and 134 protruding from its left end, tapered lobes 136 and 138 protruding from its right end, and side strips 140 and 142. Side portions of the lobes 132 and 134 join with a first stress-inducing tab 144 adapted to be folded upwardly along the line 146 and adapted to be folded downwardly along the line 148. Similarly, side portions of the lobes 136 and 138 join with a second stress-inducing tab 150 adapted to be folded downwardly along the line 152 and upwardly along the line 154.

The locations and directions of the various fold lines 146, 148, 152 and 154 may be established during the photochemical processing operations employed in the formation of the blank through the provision of surface indentations or the like in the appropriate faces of the material of the sheet. The inner fold lines 148 and 154 extend straight across the tabs 144 and 150 in a transverse direction, but the fold lines 146 and 152 at the zones where the tabs 144 and 150 join with the adjacent lobes are inclined as indicated in FIG. 24, extending first across a side portion of one of the lobes at one angle and then across the adjacent side portion of the next lobe at an opposite angle.

In forming a snap action device from the flattened blank shown in FIG. 24, the sheet material is folded back upon itself at each of the lines 146, 148, 152 and 154. Of course, the inclinations of the lines 146 and 152 make it impossible to fold the material flat upon itself along these lines, and the lobes adjacent these lines must assume three dimensional configurations as indicated in FIGS. 25 and 26. The reverse folds at lines 148 and 154 then serve to hold the material against a return to its flattened condition. This holding effect is enhanced by attaching a spacer strip 156 to the inner end portions of the folded tabs 144 and 150 so as to prevent longitudinal movements of the tabs. As shown in FIG. 25, the spacer strip 156 is adhered to the lower face of the tab 144 and to the upper face of the tab 150. However, other arrangements may be provided if desired.

In the elastically stressed condition depicted in FIG. 25, each of the four lobes 132, 134, 136 and 138 constitutes a bi-stable segment which aggressively seeks either a downwardly inclined, transversely curved configuration or an upwardly inclined, transversely curved, configuration. This embodiment is comparable in many ways to that illustrated in FIG. 20. However, the use of folds for inducing the snap action segments to assume the desired three dimensional configurations makes it feasible to eliminate a possible source of wear. In instances where the component is required to undergo millions of cycles of operation during its normal lifetime, the wearing action of an edge of a snap action segment against a groove in a rigid member (e.g. FIG. 14) might result in significant degradation of the device. No such difficulties would arise in connection with the use of components such as that illustrated in FIG. 25.

The precise nature of the three dimensional segment shapes induced by the folding operations described in connection with FIG. 25 will depend upon a number of factors. However, once the basic outlines of the component have been established, the locations and inclination of the fold lines 146 and 152 required in order to produce the desired three dimensional configurations in the snap action segments may be fixed easily by conducting a few trials. In general, an increase in fold line inclination will result in an increase in segment curvature, etc.

Another feature of the embodiment of FIGS. 24 and 25 which deserves special comment is the shape given to the side strips 140 and 142. Stiffening ribs 158 extend longitudinally along the side strips 140 and 142 to establish a basic out-of-phase relationship as between the orientations of the snap action segments at the two ends of the device. This effect is described above in connection with FIGS. 15 and 16. It will suffice here to point out that, when the segments 132 and 134 extend downwardly, the opposite segments 136 and 138 will extend upwardly, and vice versa.

In such constructions, the midportions of the side strips undergo only small flexing movements during operation of the device. Hence, these portions represent ideal locations for the attachment of support elements. In FIGS. 24 and 25, mounting tabs 159 protrude inwardly from the side strips 140 and 142 at these locations. These mounting tabs may be provided with holes 160 for receiving rivets or the like which serve to secure the component to support elements. In such assemblies, the desired pivoting or tilting actions of the snap action component may be achieved through flexing of the resilinet material, without requiring the use of pivot assemblies having friction-generating relatively movable parts.

Similar mounting tabs may, if desired, be provided in the embodiments illustrated in connection with FIGS. 7 through 23.

These assemblies also exhibit a remarkable insensitivity to acceleration loads. The symmetrical nature of the component makes it balanced against linear acceleration inputs, and a substantial degree of balance as against rotary acceleration inputs also may be achieved through the selection of proper proportions and without requiring changes in the basic construction. This balanced characteristic is a particularly valuable one in applications where the invention is to be used in severe environments.

Yet another form of blank which may be employed to form a resilient snap action segment is illustrated in FIG. 27. In this embodiment also, folding is relied upon to induce the desired three dimensional shape in an initially flat sheet 162 of resilient material.

A lobe 164 which is to form the snap action segment is provided with an arcuate group of holes 166 the outer ends of which will define the effective inner end or boundary of the snap action segment. In the illustrated flat condition of the material, the radius of curvature of this boundary is relatively long. However, a set of fold lines 168, 170 and 172 emanates from the inner end of each hole 166 so as to permit the formation of radially extending pleats in the material. In the preferred constuction, one pleat will extend downwardly from the initial plane of the material and the pleats on the opposite sides thereof will extend upwardly from the plane of the material. The pleating of the inner portion of the lobe serves to reduce the radius of curvature of the boundary defined by the outer edges of the openings 166 and the segment 164 assumes a coned configuration comparable to the coned configurations described in connection with other embodiments of the invention. This coned segment will be bi-stable and it may be used in the manner indicated above.

As will be apparent to persons skilled in the art, the snap action apparatus of this invention may be used in many different types of devices. Its characteristics make it particularly suitable for electrical switching applications, and certain exemplary switching applications are described in detail in the patent applications referred to at the beginning of this specification. The invention also may be employed in various fluid valving applications, in mechanical applications requiring sudden force release effects, and in other environments where its distinctive characteristics are desired.

It will be understood therefore that the foregoing detailed description of certain embodiments of the invention is to be considered as exemplary only, and that the scope of the invention is to be ascertained from the following claims.

What is claimed is:

1. Snap action apparatus comprising:
   a thin resilient element of sheet material including a longitudinally extending segment having first and second ends and front and back faces, said segment having a first stable three dimensional configuration in which the front face portion extending longitudinally from said first end is concave in a transverse direction and in which the cross buckling modulus of successive transverse cross sections of said segment decreases monotonically from said first end; and
   means for moving said first and second ends of said segment relative to each other in such a direction that elastic buckling of successive transverse cross sections of said segment progresses longitudinally along said segment to said first end thereof and then said segment snaps over and assumes a second three dimensional configuration in which the front face portion extending longitudinally from said first end is convex.

2. Snap action apparatus comprising:
   a thin resilient element of sheet material including a longitudinally extending segment bounded at its inner end by a concave curve and having outer edge portions which converge outwardly to a loading zone in such manner that the width of the segment progressively increases from said loading zone to a point of tangency to said curve, said segment having a coned three dimensional configuration, and
   means for bodily moving the curved inner end of said segment relative to said loading zone in a direction such as to reduce the spacing between said inner end and said loading zone, whereby a transverse flattening of said segment progresses from said loading zone to said curve and then the segment snaps over into an oppositely directed coned configuration.

3. Motion translating apparatus comprising a thin sheet of resilient material including a portion having a concavely curved edge zone, and means having a convexly curved portion bearing against said concavely curved edge zone of said sheet, the radius of curvature of said convexly curved portion being less than the natural radius of curvature of the concavely curved edge zone and said sheet being deformed elastically to reduce the radius of curvature of said edge zone and cone the adjacent portion of the sheet out of the plane of the edge whereby a steady motion of said edge may be translated into a snap motion of said coned portion of said sheet from one to the other side of said plane.

4. Motion translating apparatus comprising a thin sheet of resilient material including a body portion having an opening therein, the edge of said opening including spaced-apart concavely curved zones, and means in said opening having convexly curved portions bearing against said concavely curved zones of the edge of said opening in said sheet, the radius of curvature of each of said convexly curved portions being less than the natural radius of curvature of the corresponding concavely curved zone and the bearing pressure between said portions and zones being sufficient to elastically deform said sheet to reduce the radius of curvature of each of said zones and cone the adjacent portion of the sheet out of the plane of the edge of the opening whereby a steady motion of said edge may be translated into a snap motion of each of said coned portions of said sheet from one to the other side of the plane of said edge.

5. Motion translating apparatus as defined in claim 4, wherein said means contacts the edge of said opening in said sheet only at said concavely curved zones and wherein said zones are so spaced about the center of said opening that the algebraic sum of the bearing forces of the sheet against said means is zero.

6. Motion translating apparatus according to claim 5 wherein said spaced apart concavely curved zones of the edge of said opening in said sheet are two in number, wherein said said zones are diametrically opposed with respect to each other, and wherein said zones have equal radii of curvature.

7. Motion translating apparatus according to claim 5 wherein there are at least three of said spaced apart concavely curved zones at the edge of said opening in said sheet so as to provide at least three of said coned portions of said sheet.

8. A component having a plurality of bi-stable, snap acting segments comprising:
a thin resilient element having front and back surfaces and a central opening therethrough, said element including side strips extending along opposite sides of said opening and opposed end segments which, when unsupported and unstressed, lie substantially flat in a single plane and are bounded interiorly by concave edge portions of said opening; and
a rigid center member in said opening bearing against said curved edge portions of said opening in said resilient element to reduce the radius of curvature of each of said curved edge portions and cause said end segments to cone out of the plane of said curved edge portions;
each of said end segments being elastically movable with a snap action between one stable, coned position in which the front surface thereof is concave and another stable, coned position in which the front surface thereof is convex.

9. A component according to claim 8 wherein said thin resilient element is formed from spring metal sheet material.

10. A component according to claim 9 wherein said spring metal sheet material has laminated to at least portions thereof a layer of flexible plastic sheet material.

11. A component according to claim 8 wherein said side strips are provided with stiffening ribs extending longitudinally along the outer marginal portions thereof.

12. A component according to claim 8 wherein said thin resilient element is provided with zones of enhanced flexibility at the lateral margins of said coned end segments.

13. A component according to claim 12 wherein at least one of said zones is defined by a cut-out extending inwardly from the outer edge of the element.

14. A component according to claim 12 wherein said thin resilient element comprises a laminate including a layer of spring metal material and a layer of flexible plastic material, and wherein at least one of said zones is defined by a discontinuity in said layer of spring metal material.

15. A component according to claim 8 wherein said rigid center member includes convex edge portions adjacent to and of shorter radius of curvature than said concave edge portions of said opening in said thin resilient element, and in which the remaining edge portions of said rigid center member are spaced inwardly from the edge of said opening.

16. A component according to claim 15 wherein each of said convex edge portions of said rigid center member is provided with a notch for receiving the adjacent curved edge portion of said opening in said resilient element.

17. A snap action apparatus comprising a thin sheet of resilient material having a lobe bounded interiorly by a concave curve, said material in said lobe being substantially free of permanent deformations that cause transverse curvature in said lobe, said sheet being folded along fold lines adjacent said lobe to elastically reduce the radius of curvature of said curve and cause said lobe to seek a transverse curvature with either a three dimensional configuration in which its front face is concave or a three dimensional configuration in which its front face is convex.

18. A blank for snap action apparatus comprising a thin sheet of resilient material having a lobe bounded interiorly by a concave curve, said material in said lobe being substantially free of permanent deformations that cause transverse curvature in said lobe, said sheet including means for pleating said sheet along lines extending radially inwardly from said concave curve.

19. Snap action apparatus according to claim 17 wherein said lobe is at one end of the sheet; wherein said sheet is provided with an additional lobe at said end and a stress-inducing tab joined to adjacent side portions of said lobes; and wherein said tab is folded along a line which extends across the side portion of one of said lobes at one angle and then across the side portion of the other of said lobes at an opposite angle.

20. Snap action apparatus comprising a bi-stable segment of resilient sheet material having at one end thereof a rearwardly facing bearing edge located intermediate the lateral margins thereof and having legs extending rearwardly therefrom at locations on opposite sides of said bearing edge, means for pressing forwardly against said bearing edge and for pulling rearwardly on said legs to load said segment so that the sheet material thereof adjacent said edge is in compression and the sheet material thereof spaced from said edge is in tension whereby said loaded segment is distorted elastically to seek one of two transversely curved configurations; and means acting upon said loaded segment to snap said segment from one of said configurations to a reversely curved configuration.

References Cited
UNITED STATES PATENTS

| | | | |
|---|---|---|---|
| 1,895,591 | 1/1933 | Spencer | 74—100 |
| 2,024,362 | 12/1935 | Hoopes | 74—100 |
| 2,295,463 | 6/1942 | Fetter | 200—67 |
| 2,525,044 | 10/1950 | Puerner | 200—67 |
| 2,657,288 | 10/1953 | Hubbell | 200—67 |
| 2,703,231 | 3/1955 | Ryde | 74—100 |
| 2,864,918 | 12/1958 | Epstein | 200—67 |

WESLEY S. RATLIFF, Jr., Primary Examiner

U.S. Cl. X.R.

200—67